United States Patent [19]
Clark et al.

[11] Patent Number: 5,589,808
[45] Date of Patent: Dec. 31, 1996

[54] ENCAPSULATED TRANSFORMER

[75] Inventors: William A. Clark; Carl C. Strickland, Jr., both of Kinston; Mark C. Newman, LaGrange, all of N.C.

[73] Assignee: Cooper Industries, Inc., Houston, Tex.

[21] Appl. No.: 289,534

[22] Filed: Aug. 12, 1994

Related U.S. Application Data

[62] Division of Ser. No. 104,484, Jul. 28, 1993, abandoned.

[51] Int. Cl.$^6$ ............................ H01F 27/02; H01F 27/30
[52] U.S. Cl. ............................ 336/92; 336/96; 336/205
[58] Field of Search ............................ 336/96, 205, 192, 336/198, 92, 229, 208

[56] References Cited

U.S. PATENT DOCUMENTS

| | | | |
|---|---|---|---|
| 2,914,600 | 11/1959 | Smith et al. | 174/52 |
| 3,601,735 | 8/1971 | Bercovici | 336/96 |
| 3,626,051 | 12/1971 | Liautaud | 264/272 |
| 3,660,791 | 5/1972 | Davis | 336/205 |
| 3,662,460 | 5/1972 | Daley | 29/605 |
| 4,199,743 | 4/1980 | Martincic | 336/96 |
| 4,368,168 | 1/1983 | Slepcevic | 264/272.14 |
| 4,425,702 | 1/1984 | Murakami et al. | 29/606 |
| 4,763,095 | 8/1988 | Bradt | 336/96 |
| 4,847,557 | 7/1989 | Saito et al. | 336/96 |

FOREIGN PATENT DOCUMENTS

| | | |
|---|---|---|
| 43-10380 | 4/1943 | Japan . |
| 54-11500 | 5/1979 | Japan . |

*Primary Examiner*—Thomas J. Kozma
*Attorney, Agent, or Firm*—Burns, Doane, Swecker & Mathis LLP

[57] ABSTRACT

An encapsulated transformer includes a transformer coil assembly, a rigid core insert having an upstanding portion positioned within the hollow interior of the core and a base portion on which the core rests, and a thermoplastic rubber jacket that completely surrounds the transformer coil assembly and is bonded to the base portion of the core insert to provide a completely waterproof encapsulated transformer which is impervious to liquid and gasses that could be detrimental to the performance of the transformer. A method for producing such an encapsulated transformer includes placing a rigid core insert in a mold cavity of a mold, and positioning a transformer coil assembly in the mold cavity so that the transformer coil assembly rests on the core insert. Thermoplastic rubber is then injected into the mold cavity to completely encapsulate the transformer coil assembly in a jacket of thermoplastic rubber. During the injection step, gas in the mold cavity is vented through a vent space provided in the bottom surface of the mold cavity. A mold for encapsulating a transformer coil assembly in thermoplastic rubber includes a bottom mold portion having a mold cavity, an upstanding pin disposed within the mold cavity, a mold cover for closing the mold cavity, and a vent space positioned in the bottom surface of the mold cavity for venting gas within the mold cavity to the exterior of the mold during the injection of thermoplastic rubber into the mold cavity.

10 Claims, 8 Drawing Sheets

ENCAPSULATED TRANSFORMER

This application is a divisional of application Ser. No. 08/104,484 filed Jul. 28, 1993, now abandoned.

FIELD OF THE INVENTION

The present invention relates to transformers and more particularly to encapsulated transformers that are completely watertight.

BACKGROUND OF THE INVENTION

Transformers can be used for stepping up alternating current to high voltages for long-distance power transmission in order to minimize the relative voltage losses and also for stepping down the voltage at the point of consumption. In some applications, such as, for example, in air field runway lighting systems which aid aircraft pilots at night or during periods of poor visibility, it is necessary that the transformer be enclosed in a permanently sealed case so as to be completely watertight. The transformer should also be capable of continuous outdoor service at a wide range of temperatures (e.g., from −55° C. to +65° C.), and should operate properly when submerged in the ground with up to 5,000 volts on the primary windings. In addition, various applications also require that the encapsulated transformer exhibit other characteristics such as the ability to absorb shock without adversely affecting the operation of the transformer, the absence of internal air pockets insofar as practicable, and the ability to withstand exposure to sun, oil, gasoline, moisture, acid and alkaline soils.

In the past, transformers have been encapsulated in rubber in order to achieve the necessary watertight characteristics. The manufacture of a rubber encapsulated transformer typically involves the placement of the transformer coil assembly in a mold into which melted rubber is fed. In such processes, it has been known to use a flexible vulcanized rubber lead aligning base member 20 such as that illustrated in FIGS. 1 and 2. Such a lead aligning base member 20 includes a bottom portion 22 and an upwardly directed portion 24. The bottom portion 22 is provided with grooves 26 which serve the purpose of aligning the primary and secondary leads extending from the transformer coil assembly.

Figure 1:
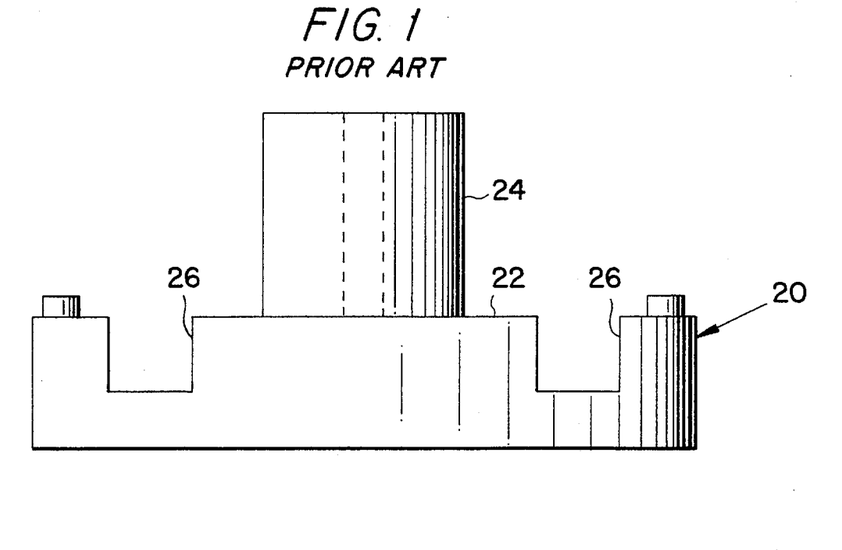
FIG. 1 is a side view of a flexible base member used during the encapsulation of a transformer coil assembly in rubber.
Figure 2:
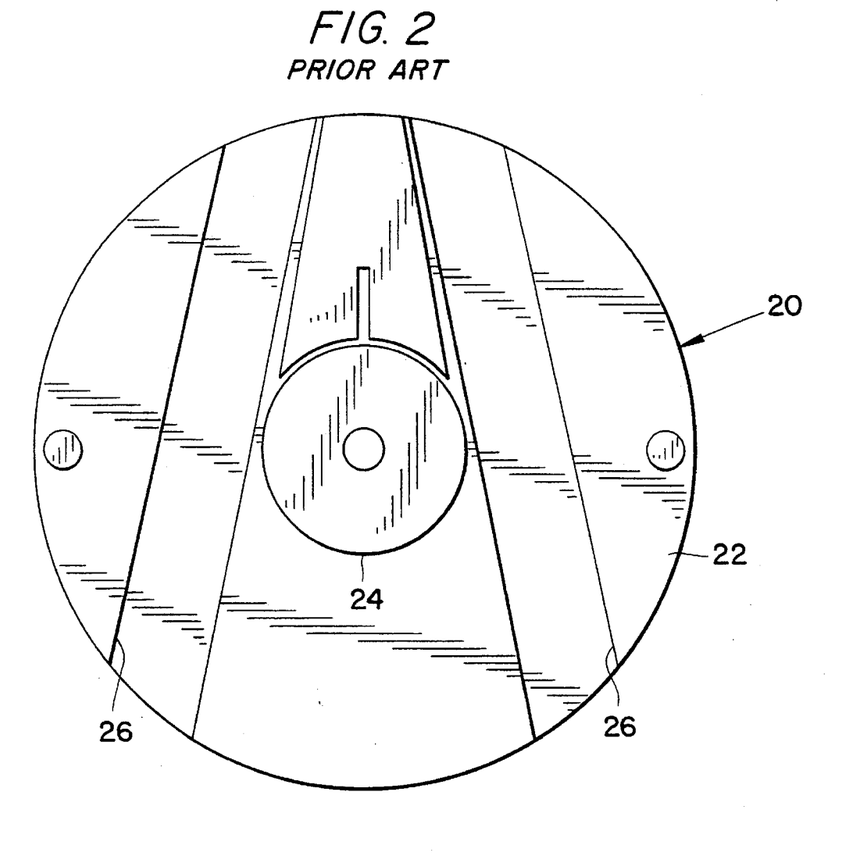
FIG. 2 is a top view of the flexible base member illustrated in FIG. I.

The manufacture of an encapsulated transformer utilizing a flexible vulcanized rubber lead aligning base member 20 such as illustrated in FIGS. 1 and 2 typically involves the following steps. The primary and secondary leads extending from the transformer coil assembly are properly aligned and the flexible vulcanized rubber lead aligning base member 20 is assembled into the transformer coil assembly so that the upwardly directed portion 24 of the base member 24 extends through the opening in the core. The grooves 26 on the lead aligning base member 20 ensure that the leads are properly positioned and captivated. The transformer coil assembly with the flexible vulcanized rubber lead aligning base member 20 is then positioned in the bottom of a mold over an upward protruding pin in the mold. Prior to placing the coil assembly and the flexible base member into the mold, one or more layers of unvulcanized rubber material is placed in the bottom of the mold in order to allow identification indicia to be stamped into the outer surface of the encapsulated transformer once the molding operation is complete. Once the transformer coil assembly with the flexible lead aligning base member 20 is positioned in the mold, the mold is closed and rubber is forced to flow into the mold at a relatively low injection pressure until the mold is filled. The filled mold, which is heated, is then held under pressure for a period of about 45 minutes in order to properly cure the rubber. Once the curing is complete, the mold is opened and the encapsulated transformer is removed.

The production of rubber encapsulated transformers is susceptible of certain improvements. For example, the amount of time required to fabricate a single rubber encapsulated transformer (i.e., approximately 45 minutes) is not readily conducive to high output with a relatively few number of molds. Indeed, the encapsulation of transformer coils assemblies in rubber typically requires numerous molds in order to meet the desired production requirements for a given facility.

Attempts have apparently also been made to encapsulate transformer coil assemblies in thermoplastic rubber. However, it has been found that such attempts have been limited to relatively small size transformers. That is believed to be due, at least in part, to the fact that a larger transformer coil assembly requires greater amounts of thermoplastic rubber to completely encapsulate the transformer coil assembly. Since the thermoplastic rubber must be injected into the mold in a very short period of time in order to prevent the thermoplastic rubber from curing prior to complete encapsulation of the transformer assembly, significant pressures are developed within the mold during the injection process. It is believed that the significant pressures developed during encapsulation of larger transformer coil assemblies were so great that it was deemed practically impossible to produce a defect-free completely watertight transformer encapsulated in thermoplastic rubber.

In light of the foregoing, it would be quite desirable to be able to produce an encapsulated transformer that is completely watertight and impervious to air. Moreover, it would be desirable to produce such an encapsulated transformer in a relatively short period of time to facilitate high quantity production.

SUMMARY OF THE INVENTION

In accordance with one aspect of the present invention, an encapsulated transformer comprises a transformer coil assembly that includes a core having a hollow interior, primary wire windings and secondary wire windings, at least one primary lead connected to the primary windings, at least one secondary lead connected to the secondary windings, and a rigid core insert having an upstanding portion positioned within the hollow interior of the core and a base portion on which the core rests. A unitary thermoplastic rubber jacket completely surrounds the transformer coil assembly and is bonded to the base portion of the core insert in order to provide a completely waterproof encapsulated transformer.

In accordance with another aspect of the present invention, a method for producing an encapsulated transformer comprises providing a transformer coil assembly that includes a core having a hollow interior, primary wire windings and secondary wire windings, placing a rigid core insert centrally in a mold cavity of a mold, and positioning the transformer coil assembly in the mold cavity so that the transformer coil assembly rests on a base portion of the core insert while an upstanding portion of the core insert is positioned in the hollow interior of the core. The mold cavity is then closed and thermoplastic rubber is injected into the mold cavity to completely encapsulate the transformer coil assembly in a jacket of thermoplastic rubber and bond the thermoplastic rubber to the base portion of the core insert. After a relatively short period of time, the mold cavity is opened and the encapsulated transformer coil assembly with the jacket of thermoplastic rubber is ejected from the mold cavity, thereby resulting in a completely waterproof encapsulated transformer.

In accordance with another aspect of the present invention, a method of producing a completely encapsulated watertight transformer comprises providing a mold which has a mold cavity and at least one dowel pin positioned in a bottom of the mold cavity. The dowel pin is disposed in a hole in the mold so that a vent space which communicates with the mole cavity exists between an outer periphery of the dowel pin and an inner periphery of the hole. The method also involves providing a transformer coil assembly that includes a core having a hollow interior, primary wire windings and secondary wire windings wound around the core, and providing a core insert that includes a base portion, an upstanding portion extending from the base portion and a hole extending through the base portion and into the upstanding portion. The core insert is placed within the mold cavity so that the base portion rests on the bottom of the mold cavity while the vent space defined by the dowel remains uncovered. After the mold cavity is closed, thermoplastic rubber is injected into the mold cavity. During the injection of the thermoplastic rubber, gas within the mold cavity is vented by allowing gas to escape to the exterior of the mold through the vent space. The mold cavity is opened after the transformer coil is completely encapsulated within a jacket of thermoplastic rubber, and the encapsulated transformer coil assembly is then injected from the mold cavity to result in the completely watertight encapsulated transformer.

In accordance with a further aspect of the present invention, a mold for completely encapsulating a transformer coil assembly in a casing of thermoplastic rubber includes a bottom mold portion having a mold cavity formed therein that is sized and configured to receive a transformer coil assembly so that a space exists between an outer periphery of the transformer coil assembly and an inner surface of the mold cavity. The mold is provided with gates for allowing thermoplastic rubber to be injected into the mold cavity, and an upstanding pin that extends upwardly within the mold cavity from a bottom surface of the mold cavity for receiving a core insert. A movable mold cover is provided for opening and closing the mold cavity, and vent means are positioned in the bottom surface of the mold cavity for venting gas within the mold cavity to the exterior of the mold during injection of the thermoplastic rubber into the mold cavity. The vent means is positioned radially outwardly of the upstanding pin and communicates the mold cavity with the exterior of the mold.

BRIEF DESCRIPTION OF THE DRAWING FIGURES

The foregoing features, in addition to others, will become more apparent from the description set forth below considered in conjunction with the accompanying drawing figures in which like elements bear like reference numerals and wherein.

DETAILED DESCRIPTION OF THE PREFERRED EMBODIMENT

Figure 3:
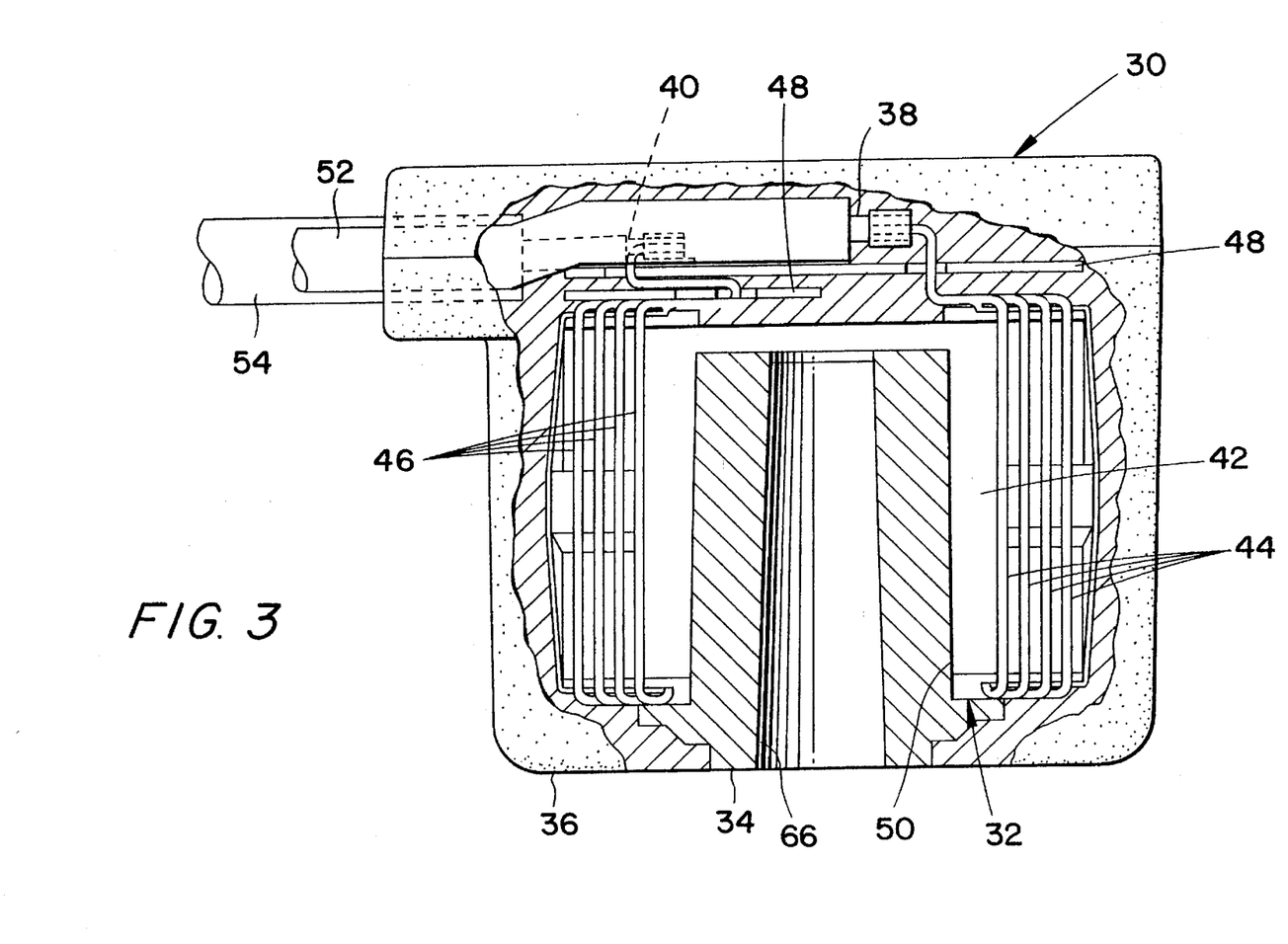
FIG. 3 is a partial cross-sectional view of an encapsulated transformer in accordance with the present invention.

With reference initially to FIG. 3, the encapsulated transformer 30 according to the present invention includes a transformer coil assembly 32, a rigid core insert 34 that is separate from the transformer coil assembly 32, a jacket 36 of thermoplastic rubber that completely encapsulates the transformer coil assembly 32 in a watertight manner, two primary leads 38 (only one of which is shown in FIG. 3) and two secondary leads 40 (only one of which is shown in FIG. 3).

The transformer coil assembly 32 is of a known construction and includes a core 42 having a hollow interior 50, primary wire windings 44 wound around the core 42, and secondary wire windings 46 also wound around the core 42. Various insulator discs 48 can also be provided to, for example, space the wire windings 44, 46 from the core 42. In a known manner, the primary leads 38 are connected to the primary wire windings 44 while the secondary leads 40 are connected to the secondary wire windings 46.

In a preferred embodiment of the present invention, the thermoplastic rubber jacket which encapsulates the transformer coil assembly 32 and is bonded to the core insert 34 has as a base material polypropylene. One product that has been found to be particularly useful is SANTOPRENE (a trademark of Monsanto, licensed to Advanced Elastomer Systems) sold by Advanced Elastomer Systems. Preferably, the same polypropylene based thermoplastic rubber material that is used to encapsulate the transformer coil assembly 32 is also used to provide a casing 52 that surrounds the primary leads 38 and a casing 54 that surrounds the secondary leads 40. However, a slightly different grade of thermoplastic rubber is preferably used to encase the leads 38, 40 since the thermoplastic rubber material which encases the leads 38, 48 contacts copper.

The use of the aforementioned type of thermoplastic rubber material for encapsulating the transformer coil assembly is particularly useful in the context of transformers for air field runway lighting systems as it is capable of meeting current FAA specifications for environmental performance. For example, SANTOPRENE is brittle-proof to about −81° F. which exceeds the standard of −40° F. or greater set by the FAA. The aforementioned material is also advantageous in that the cost of manufacturing and the individual material cost per pound is less than in the case of other materials. Quite desirably, however, the aforementioned material has a look and feel that is similar to rubber.

Figures 4, 5, 6, 7:
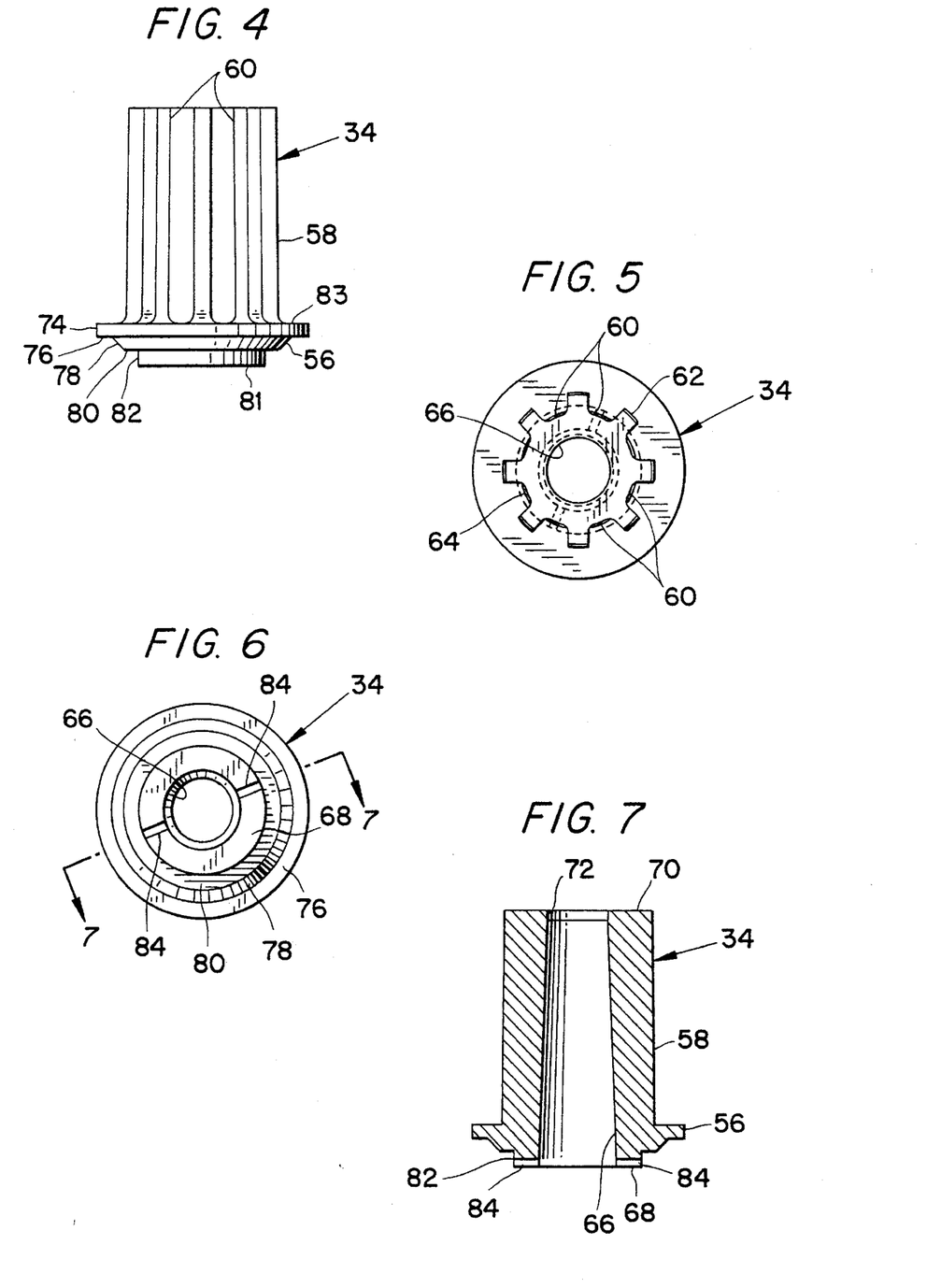
FIG. 4 is a side view of the core insert which forms a part of the encapsulated transformer of the present invention.
FIG. 5 is a top view of the core insert illustrated in FIG. 4.
FIG. 6 is a bottom view of the core insert illustrated in FIG. 4.
FIG. 7 is a cross-sectional view of the core insert taken along the section line 7—7 in FIG. 6.

With reference to FIGS. 4–7, the rigid core insert 34 includes a base portion 56 and an upstanding portion 58 that extends upwardly away from the base portion 56. As best seen in FIGS. 4 and 5, the upstanding portion 58 is provided with a plurality of grooves 60 that extend along the length of the upstanding portion 58. Preferably, the grooves 60 extend along the entire longitudinal extent of the upstanding portion 58. As seen in FIG. 5, the grooves are configured in such a way that their width narrows from the outer circumference 62 of the upstanding portion 58 to the bottom 64 of the grooves.

With reference to FIG. 7, a through hole 66 is provided in the rigid core insert 34 and extends through the base portion 56 as well as the upstanding portion 58. The internal diameter of the through hole 66 is preferably tapered so that the internal diameter of the through hole 66 adjacent the end face 68 of the base portion 56 is greater than the internal diameter of the through hole 56 at the top end 70 of the upstanding portion 58. An inwardly directed shoulder 72 is located in the through hole 66 adjacent the top end 70 of the upstanding portion 58 for purposes of centering the rigid core insert 34 when the core insert is inserted into the mold cavity as will be described in more detail below.

As can be seen from FIGS. 4 and 7, the base portion 56 of the rigid core insert 34 has an outer peripheral surface that is defined by a plurality of angularly arranged outer peripheral surface portions 74, 76, 78, 80, 82. That is, the outer periphery of the base portion 56 is defined by a peripheral surface portion 74 which extends generally parallel to the longitudinal axis of the core insert 34, a peripheral surface portion 76 which extends generally perpendicular to the longitudinal axis of the core insert 34, a peripheral surface portion 78 that extends obliquely or diagonally with respect to the longitudinal axis of the core insert 58, a peripheral surface portion 80 which extends generally perpendicular to the longitudinal axis of the core insert 34 and a peripheral surface portion 82 that extends generally parallel to the longitudinal axis of the core insert 34. The various angularly arranged peripheral surface portions 74, 76, 78, 80, 82 of the bottom portion 56 are advantageous in that they provide significant surface area which contributes to achievement of a good bond between the thermoplastic rubber jacket and the base portion 56 of the core insert 34 during the injection molding process. It is to be understood, however, that other configurations for the outer peripheral surface of the base portion 56 of the rigid core insert 34 are possible, so long as sufficient surface area is provided for effecting a good bond between the base portion 56 of the core insert 56 and the thermoplastic rubber jacket.

As seen in FIG. 7, the end face 68 of the base portion 56 that rests on the bottom of the mold cavity during the injection process is provided with two grooves 84 that are positioned on diametrically opposite sides of the through hole 66. As illustrated in FIG. 7, the grooves 84 extend between and provide communication between the through hole 66 and the peripheral surface portion 82 of the base portion 56. As will be explained in more detail below, one function served by the grooves 84 is to provide a vent path for venting gas and pressure that develops in the mold cavity during the injection molding process.

The rigid core insert 34 is preferably fabricated of a glass filled polypropylene material. A product available from RTP Company in Winana, Minn., under the product description RTP 107cc having a glass content of 40% has been found to be particularly useful. A fiber content of 40% has been found to be highly desirable, and indeed necessary, for producing a rigid core insert that is able to withstand the significant pressures developed during the injection molding process and that is much more rigid than the flexible rubber base member described above and shown in FIGS. 1 and 2. Thermoplastic rubber having a glass fiber content of 40% is advantageous as it possesses a tensile modules of approximately $1.3 \times 10^6$ psi, a tensile strength of 16,000 psi, a compression strength of 13,000 psi, an impact strength as measured by the Izod test of 2.0 notched (¼ inch) and 13.0 un-notched, a deflection temperature of 300° F. at 264 psi and a deflection temperature of 330° F. at 66 psi. In addition, the use of a polypropylene based material for fabricating the core insert is particularly advantageous as it allows a natural chemical bonding to be achieved with respect to the preferred polypropylene based thermoplastic rubber material that is used to encapsulate the transformer coil assembly 32.

FIGS. 8, 8(a), 9, 9(a), and 10 illustrate the various features associated with the mold that is used in accordance with the present invention to encapsulate the transformer coil assembly with thermoplastic rubber. Many of the details of the mold are known to persons of ordinary skill in the art and thus, will not be described herein in detail. Rather, only those details of the mold 90 which are necessary for an appreciation and understanding of the present invention will be described.

Figures 9, 9A:
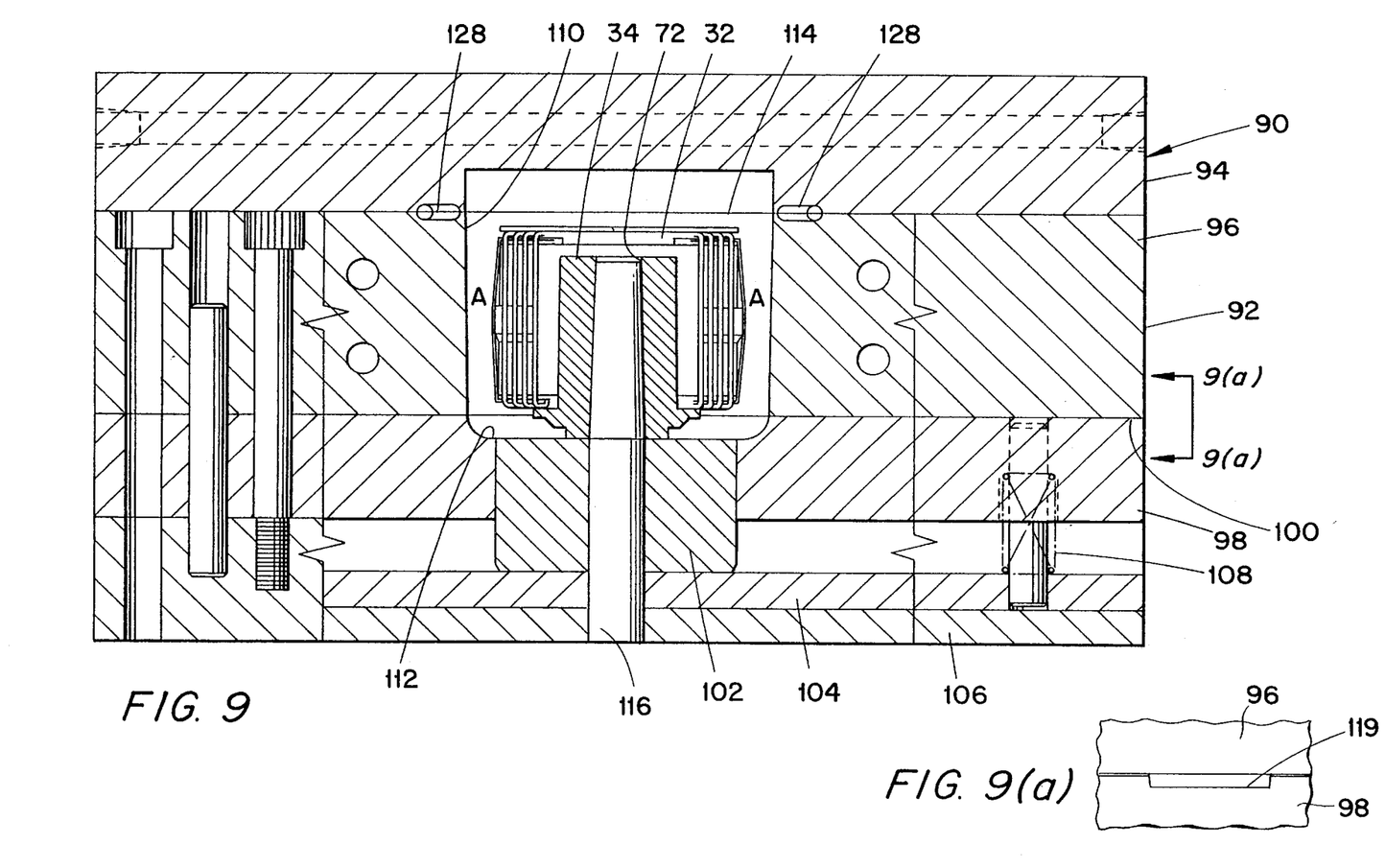
FIG. 9 is a cross-sectional view of the mold taken along the section line 9—9 in FIG. 8 and illustrating the transformer coil assembly and the core insert positioned in the mold cavity.
FIG. 9(a) is a side view of the bottom portion of the mold as seen in the direction of the line 9(a)—9(a) in FIG. 9.

With reference initially to FIG. 9, the mold 90 includes a bottom mold portion 92 and a mold cover 94. The bottom mold portion 92 is comprised of an upper plate 96 and a lower plate 98 which meet at a parting line 100. An ejector block 102 is mounted on an ejector plate 104 which is mounted in an ejector housing 106. Through appropriate operation of an ejector assembly 108, the ejector plate 104 and the ejector block 102 can be moved up and down to eject the encapsulated transformer from within the mold cavity 110 at the end of the molding cycle.

A mold cavity 110 is defined within the bottom mold portion 92 and extends through the entire depth of the upper plate 96 and through a portion of the depth of the lower plate 98. Thus, the parting line 100 between the upper plate 96 and the lower plate 98 is located intermediate the bottom surface 112 of the mold cavity 110 and the top surface 114 of the bottom mold portion 92.

An upstanding pin 116 extends upwardly into the mold cavity 110 and serves as a support structure upon which the rigid core insert 34 can be mounted. The upstanding pin 116 extends into the through hole 66 in the core insert 34 and the tip end of the upstanding pin 116 engages the inwardly directed shoulder 72 so that the core insert 34 is properly centered on the upstanding pin 116. The portion of the upstanding pin 116 that extends into the mold cavity 110 can be tapered in a manner that substantially corresponds to the taper of the through hole 66 in the rigid core insert 34.

As can be seen with reference to FIG. 9(a), the upper surface of the lower plate 98 is provided with a groove 119. As illustrated in FIG. 9(a), the depth of the groove 119 is greatly enlarged for purposes of ease in understanding. In actuality, the depth of the groove 119 can be on the order of 0.0015–0.0020 inches.

Figures 8, 8A:
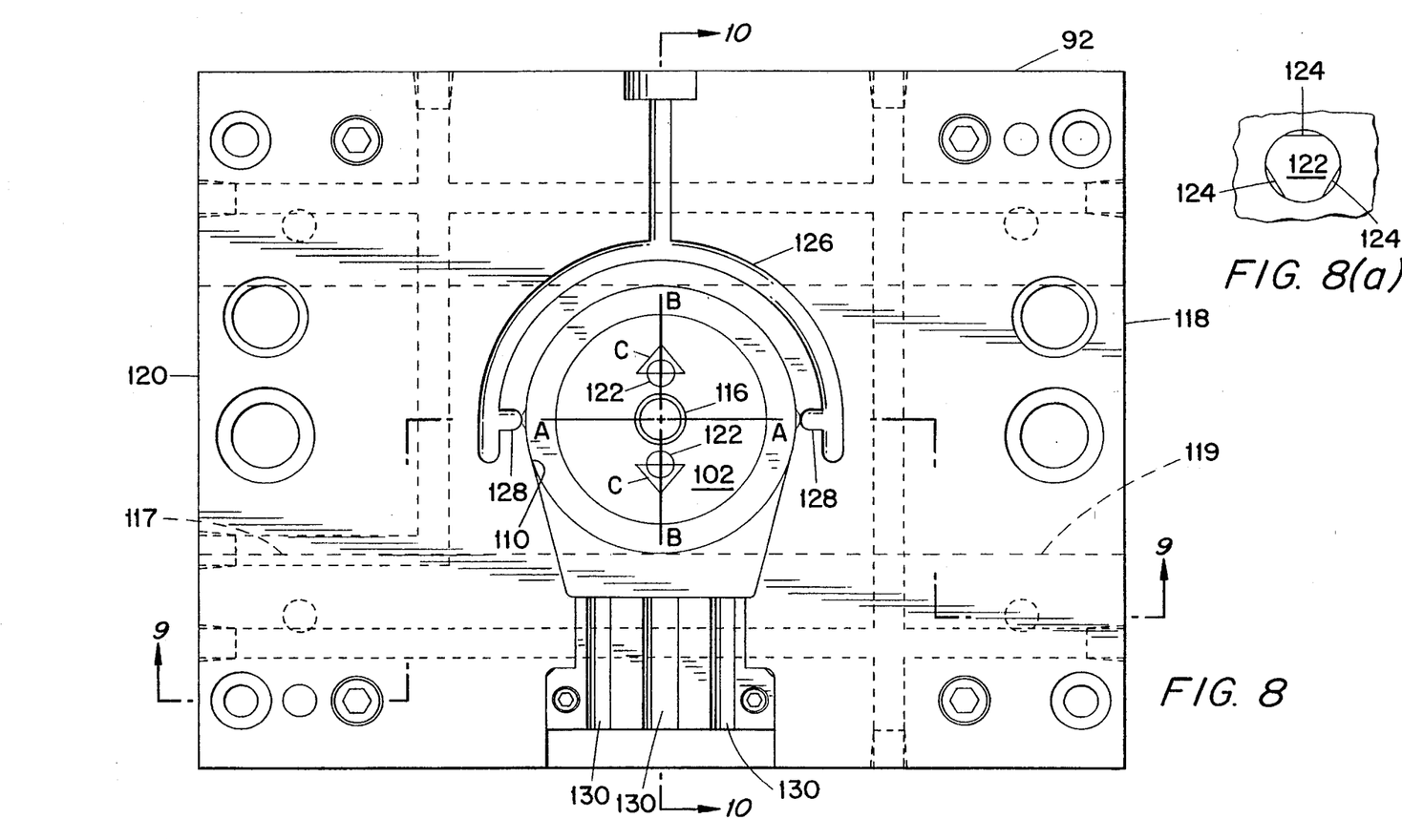
FIG. 8 is a top view of the bottom portion of the mold utilized to manufacture the encapsulated transformer of the present invention.
FIG. 8(a) is an enlarged plan view of one of the dowels that is located in the bottom of the mold cavity for providing a vent space that allows venting of gasses during the injection process.

As best illustrated in FIG. 8, the groove 119 extends from the edge 118 of the bottom mold portion 92 to the interior of the mold cavity 110. In that way, the groove 119 provides communication between the interior of the mold cavity 110 and the exterior of the mold 90. Another groove 117 extends from the opposite edge 120 of the bottom mold portion 92 to the interior of the mold cavity 110. This latter groove 117 also provides communication between the interior of the mold cavity 110 and the exterior of the mold 90. Preferably, the width of each of the grooves 119, 117 is the same or substantially the same as the internal diameter of the mold cavity 110. As will be explained in more detail below, the grooves 119, 117 serve as a vent for allowing the escape of gasses and the venting of pressure from the interior of the mold cavity 110 during the injection process. Although FIG. 9(a) illustrates the groove 119 as being formed in the top surface of the lower plate 98, it is to be understood that both grooves 119, 117 could also be formed in the bottom surface of the upper plate 96.

With reference to FIG. 8, the bottom mold portion 92 is also provided with two dowel pins 122 that are disposed on diametrically opposite sides of the upstanding pin 116. The dowel pins 122 are positioned in cylindrical holes formed in the bottom mold portion 92. As seen more clearly in the enlarged view of FIG. 8(a), the outer peripheral surface of each of the dowel pins 122 is provided with a plurality of flats 124. In the preferred embodiment, the outer peripheral surface of each dowel pin 122 is provided with three flats that are equally spaced apart from one another around the outer periphery of the dowel pin 122. The flats 124 preferably extend along the entire length of the dowel pins 122. The flats 124 define a vent space between the inner surface of the hole in which the dowel pin is disposed and the outer peripheral surface of the dowel pin 122. The vent space communicates the interior of the mold cavity 110 with the exterior of the mold. The vent space defined by the flats 124 can be communicated with the exterior of the mold by providing a suitable space between the ejector block 102 and the ejector plate 104.

For reasons that will become more apparent from the description below, the position of the dowel pins 122 in the mold cavity 110 is quite important. As can be best seen in FIG. 10, the dowel pins are positioned within the mold cavity in such a manner that when the transformer coil assembly 32 and the rigid core insert 34 are disposed in the mold cavity 110, the center of each dowel pin 122 is positioned on the outer diameter of the end face of the core insert 34 that rests on the bottom surface 112 of the mold cavity 110.

With reference once again to FIG. 8, the top surface of the bottom mold portion 92 is provided with a runner 126 that communicates with the unit that injects the thermoplastic rubber into the mold cavity 110. The runner 126 is semicircular in shape and communicates with two gates 128 that are positioned on diametrically opposite sides of the mold cavity 110. The gates 128 preferably fan or flare outwardly as well as downwardly to aid in the flow of the thermoplastic rubber into the mold cavity 110. It is to be noted that the dowel pins 122 are positioned along a line that is disposed perpendicular to a line passing through the two gates 128. In other words, each of the dowel pins 122 is angularly offset 90° with respect to the position of the gates 128.

The upper surface of the bottom mold portion 92 is also provided with a plurality of grooves 130 for receiving the primary and secondary leads 38, 40 once the transformer coil assembly is positioned within the mold cavity 110. The grooves 130 help facilitate proper positioning of the primary and secondary leads during the injection molding process.

Figure 10:
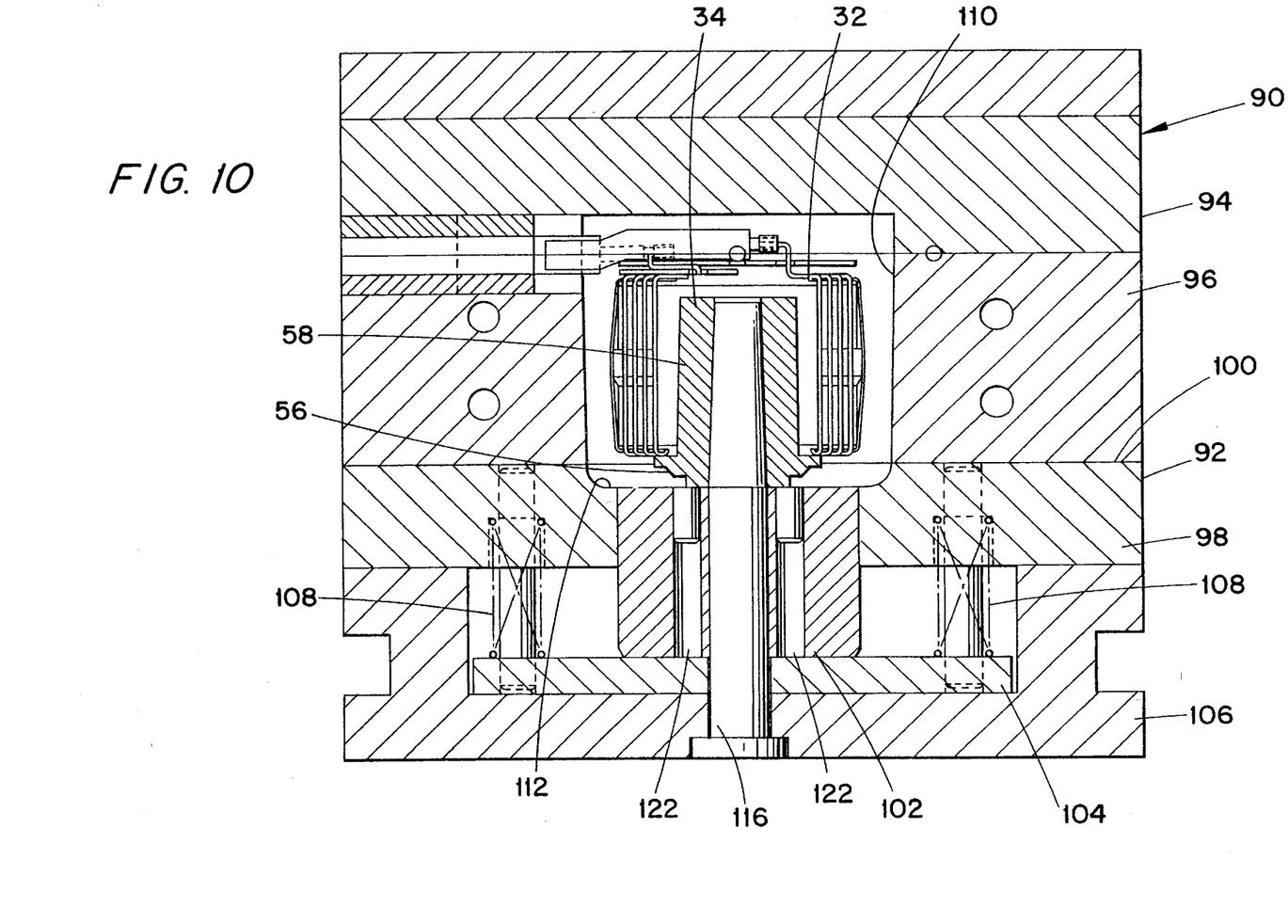
FIG. 10 is a cross-sectional view of the mold taken along the section line 10—10 in FIG. 8 illustrating the transformer coil assembly and the core insert positioned within the mold cavity.

As seen in FIG. 10, the ejector block 102 is disposed within an opening that extends through the lower plate 98. Preferably, the outer surface of the ejector block 102 is provided with a plurality of flats that define clearance spaces or vent spaces between the outer surface of the ejector block 102 and the inner surface of the opening in the lower plate 98 in which the ejector block 98 is positioned. Those clearance spaces communicate the mold cavity 110 with the exterior of the mold 90. Although not specifically illustrated, the flats on the outer periphery of the ejector block 102 can extend along the length of the ejector block (i.e., parallel to the longitudinal axis of the ejector block 98) and can be similar to the flats 124 on the dowel pins 122 shown in FIG. 8(a). The flats on the outer surface of the ejector block can be eight in number and on the order of 0.002 in. in depth. The depth of the flats on the outer surface of the ejector block 98 can be slightly less than the depth of the flats on the dowel pins 122.

Likewise, the outer surface of the upstanding pin 116 can be provided with a plurality of flats, preferably three in number, that extend longitudinally along the length of the pin 116 (i.e., parallel to the longitudinal axis of the pin 116) to define vent spaces or clearance spaces between the outer periphery of the pin 116 and the inner periphery of the hole in the ejector block 102 through which the upstanding pin 116 extends to thereby communicate the mold cavity 110 with the exterior of the mold. The flats on the upstanding pin can also be ground to a depth of approximately 0.002 in. and can be similar to the flats on the dowel pins 122 as depicted in FIG. 8(a).

Having described the features and characteristics associated with the mold that is employed to encapsulate the transformer coil assembly, the method of encapsulating the transformer coils assembly will now be described.

Prior to the encapsulation process, the rigid core insert 34 and the transformer coil assembly 32 are fabricated separately. The primary and secondary leads 38, 40 which are attached to the primary and secondary windings 44, 46 are encased within respective thermoplastic rubber casings 52, 54 as seen in FIG. 3. In order to ensure a good bond between the rigid core insert 34 and the thermoplastic rubber jacket on the one hand, and between the thermoplastic rubber casings 52, 54 and the thermoplastic rubber jacket on the other hand, it has been found to be useful to heat the core insert 34 and the thermoplastic rubber casings 52, 54 immediately prior to the injection molding operation. In that regard, the rigid core insert can be placed in an oven in order to heat the core insert to a temperature of about 140° F.–180° F., preferably 145° F.–155° F. The thermoplastic rubber casings 52, 54 surrounding the primary and secondary leads 38, 40 can be placed under a heat lamp and heated to a temperature of about 130° F.–160° F., preferably 140° F.–155° F.

Once the rigid core insert 34 has been heated to the desired temperature, it is placed within the mold cavity 110 so that the upstanding pin 116 extends through the hole 66 in the core insert. The inwardly directed shoulder 72 located adjacent the top end of the through hole 66 in the core insert 34 helps ensure that the core insert 34 is properly centered on the upstanding pin 116. In addition, the core insert 34 is positioned within the mold cavity 110 such that the grooves 84 on the bottom of the core insert 34 are aligned with the dowel pins 122 (i.e., the grooves, 84 overlie a portion of the dowel pins 122). A suitable locating mechanism (not shown) can be provided to ensure alignment of the grooves 84 with the dowel pins 122.

Thereafter, the transformer coil assembly 32 is placed within the mold cavity 110 so that the transformer coil assembly 32 rests on the upwardly facing surface of the base portion 56 of the rigid core insert 34. Thus, the upstanding portion of the rigid core insert 34 is positioned in the hollow interior 50 of the core 42. The primary and secondary leads 38, 40 are then properly positioned in the grooves 130 formed in the upper surface of the bottom mold portion 92.

During the placement of the transformer coil assembly 32 in the mold cavity 110 and on the core insert 34, the longitudinal extending grooves 60 formed in the outer peripheral surface of the upstanding portion 58 of the core insert 34 advantageously help prevent the primary and secondary wire windings 44, 46 from becoming damaged. The primary and secondary wire windings 44, 46 are typically provided with a coating such a polyurethane. If that coating is penetrated, such as by being scraped off, the resulting exposure of the underlying wire could be detrimental to proper operation of the transformer should two exposed wires contact one another. The grooves 60 formed in the outer peripheral surface of the upstanding portion 58 of the core insert 34 provide regions in which the wire windings 44, 46 can be received. Thus, the grooves help reduce the possibility that the coating on the wires will be damaged.

The way in which the outer diameter of the upstanding portion 58 of the core insert 34 tapers in a narrowing manner towards the top end of the core insert 34 is advantageous in that it helps facilitate and make easier the placement of the transformer coil assembly 32 on the core insert 34. Further, during the injection molding process, it is quite important that the transformer coil assembly 32 be centrally located within the mold cavity. The core insert 34 as a whole, in conjunction with its shape and configuration, allows achievement of that objective.

Once the transformer coil assembly 32 is placed on the core insert 34 within the mold cavity 110, the mold cover 94 is lowered onto the bottom mold portion 92 to thereby enclose the mold cavity 110. Thermoplastic rubber at a temperature of approximately 400° F.–420° F. is then injected into the mold cavity by way of the runners 126 and the gates 128. The positioning of the gates 128 on diametrically opposite sides of the mold cavity helps maintain an even pressure distribution on the sides of the transformer coil assembly 32 which helps to ensure that the transformer coil assembly remains centrally positioned within the mold cavity 110. Also, the fanning of the gates 128 facilitates the flow of thermoplastic rubber into the mold cavity 110 in multiple directions, thereby aiding in the injection process.

During the injection step, the mold cavity 110 fills from the top down. With reference to FIGS. 8 and 9, the first area of the mold cavity 110 to be filled is the area surrounding the top portion of the transformer coil assembly 32. The flow of thermoplastic rubber is then forced down along the sides of the mold cavity 110 at the point where the thermoplastic rubber exits the gates 128 (see the region designated A in FIGS. 8 and 9). Approximately three-fourths of that area is filled with thermoplastic rubber when the pressures within the mold cavity 110 cause the thermoplastic rubber to flow towards the sides of the mold cavity that are located 90° with respect to the gates 128 (see the areas designated B in FIG. 8). As the injection process continues, the thermoplastic rubber fills in the areas B located perpendicular to the gates 128, and flows towards and along the bottom surface of the mold cavity 110. The very last region of the mold cavity 110 to be filled are the regions at the bottom of the mold cavity 110 where the dowel pins 122 are located (see the regions designated C in FIG. 8).

As noted above, the thermoplastic rubber is injected into the mold cavity at a temperature of about 400° F.–420° F. The temperature of the mold, on the other hand, is significantly cooler, on the order of approximately 125° F.±10° F. As a result of that temperature differential, the thermoplastic rubber begins to solidify or cure almost immediately upon entering the mold cavity. Consequently, the thermoplastic rubber must be injected into the mold cavity 110 at an extremely fast rate to ensure that all of the thermoplastic rubber is injected into the mold cavity 110 before significant solidification of the thermoplastic material begins. As a result, significant pressures are produced within the mold cavity that, if not properly vented, will result in air or other gasses being trapped within the encapsulated transformer. Of course, with larger transformer coil assemblies, more thermoplastic rubber is required to completely encapsulate the transformer coil assembly, which means that even greater pressures are produced since a greater amount of material must be injected into the mold cavity within roughly the same short period of time.

As the thermoplastic rubber is initially injected into the mold cavity, there are five possible ways by which gasses from the molten thermoplastic rubber and air in the mold cavity 110 can be vented. They are: 1) through the parting line between the mold cover 94 and the upper plate 96; 2) through the grooves 119, 117 formed adjacent the parting line 100 between the upper and lower plates 96, 98; 3) through the vent spaces (defined by the flats on the outer surface of the ejector block 102) provided between the outer surface of the ejector block 102 and the inner surface of the hole in the lower plate 98 in which the ejector block 102 is located; 4) through the vent spaces (defined by the flats on the outer periphery of the upstanding pin 116) provided between the outer surface of the upstanding pin 116 and the inner surface of the hole in the ejector block 102 through which the upstanding pin 116 extends; and 5) through the vent spaces (defined by the flats on the outer surface of the dowel pins 122) provided between the outer surface of the dowel pins 122 and the inner surface of the holes through which the dowel pins 122 extend in the bottom of the mold cavity 110.

As noted above, the first area of the mold cavity 110 that is filled is the top portion of the transformer coil assembly. Thus, very early on in the injection process, venting path identified above as (1) is closed. When the top portion of the transformer coil assembly is filled, an enclosed pressure region is created between the bottom of the mold cavity 110 and the filled upper portion of the mold cavity 110. As the thermoplastic rubber continues to flow into the mold cavity 110, air and gasses from the molten thermoplastic rubber that are located in that enclosed pressure region must be allowed to escape. The vent grooves 119, 117 which are provided adjacent the parting line 100 between the upper and lower plates 96, 98 is quite effective in that regard as they allow the bulk of the air and other gasses to be vented out of the mold cavity 110 rather quickly. However, once the thermoplastic rubber flows past the vent grooves 119, 117, it is no longer possible to vent air and gasses through those grooves 119, 177 (i.e., the vent path identified above as (2) is closed). Nevertheless, air and gasses remain in the mold cavity 110 and must be vented. That further venting is achieved by way of the venting paths (3)–(5) mentioned above.

As the last portion of thermoplastic rubber is injected into the mold cavity 110, the thermoplastic rubber begins flowing along the bottom surface of the mold cavity towards the centrally located core insert 34. As a result, the vent path identified above as (3) is closed off.

As mentioned above, it has been discovered that the very last area in the mold cavity to be filled is the area designated C in FIG. 8. Even as these last small regions of the mold cavity are being filled, air and other gasses can still be present in the mold cavity 110. To achieve a properly encapsulated defect-free transformer, it is quite important that any remaining air or gasses be afforded a vent path to the exterior of the mold prior to complete encapsulation of the transformer coil assembly. That remaining air or gas in the mold cavity can be vented by way of the grooves 84 on the core insert and through the vent path identified as (2) above. However, it has been found that such a vent path does not provide sufficient vent space to achieve the requisite venting. That is, the mold cavity may contain too much air or gas to be properly vented by way of the vent path identified as (2) above before completion of the injection step. The vent paths defined by the flats 124 on the dowels pins 122 are specifically designed to provide sufficient venting regions to ensure that the air and gas is vented to the extent necessary prior to completion of the injection step. Thus, the particular positioning of the dowel pins 122 (particularly with respect to the gates 128) is very significant as they are located adjacent the region of the mold cavity that is last filled. Indeed, it has been found that in the absence of the vent paths in the regions where the dowel pins 122 are positioned, air or other gasses become trapped around the coil winding wires which will migrate to the top of the transformer and cause a massive ballooning effect when the mold cover is opened and pressure is relieved from the top of the transformer.

The alignment of the grooves 84 on the core insert 34 with the dowel pins 122 is also significant. As the thermoplastic rubber flows along the bottom of the mold cavity towards the core insert 34, a portion of each of the dowel pins 122 is initially covered. Thus, one of the flats 124 on the dowel pins 122 (or possibly one flat and one-half of another flat) becomes covered. However, the grooves 84 formed in the end thee 68 of the core insert 34 allow air and gas to be vented through the vent space defined by the flats 124 on the dowel pins 124 that have not been covered by the thermoplastic rubber (i.e., the flats 124 which are positioned below the core insert 34).

It is to be noted that during the injection molding process, the longitudinally extending grooves 60 in the upstanding portion 58 of the core insert 34 allow the thermoplastic rubber to flow into the interior area of the transformer coil and fill the grooves 60. In the finished product, the thermoplastic rubber material in the grooves 60 has been found to be useful in providing internal insulation support and shock resistance.

As mentioned above, the outer peripheral surface of the base portion 56 of the core insert 34 is provided with a plurality of angularly oriented peripheral surface portions 74, 76, 78, 80, 82. In that way, the outer periphery of the base portion 56 presents significantly greater surface area than would otherwise be the case if the outer periphery of the base portion 56 were defined by an outer surface extending entirely parallel to the longitudinal axis of the core insert 34. Consequently, adequate bonding between the thermoplastic rubber jacket and the base portion of the core insert can be achieved.

In designing the core insert 34, it has been found that core insert should be fabricated of a material that imparts significant strength and rigidity to the core insert 34 in order to withstand the large pressures created during the injection molding operation. In addition, the end surface 81 (see FIG. 4) of the base portion 56 which rests on the bottom of the mold cavity 110 should be suitably dimensioned to prevent damage to the core insert during the injection molding process. In particular, the ledge 83 (see FIG. 4) on the core insert 34 upon which the transformer coil assembly 32 rests during the injection molding operation is positioned radially outwardly of the end surface 81 of the core insert 34. Thus, during the injection molding operation, the pressure created within the mold cavity acts across the surface of the transformer coil assembly 32 and is directed downwardly onto the overhanging ledge 83 of the core insert 34. If the surface area defined by the end surface 81 is too small, that downwardly acting force will actually cause the ledge 83 to curl downwardly, thereby making it almost impossible to achieve a watertight, defect-free encapsulated transformer.

Fabricating the core insert of fiber reinforced plastic material is quite important as it results in a core insert that is strong, rigid and capable of contributing to the ability of the core insert to withstand the downward force exerted by the transformer coil assembly. In addition, it has been found to be important to dimension the end surface 81 of the core insert 34 such that the ratio of the surface area of the transformer coil assembly (as defined by the diameter across the core 22) to the surface area of the end surface 81 (as defined by the diameter of the end surface) should be equal to or less than about 5:1.

The manufacture of an encapsulated transformer in accordance with the present invention provides numerous advantages. For example, it has been found that a transformer coil assembly manufactured in accordance with the present invention can be completely encapsulated in approximately three and one-half minutes as measured from the beginning of the injection cycle to the time the mold cover is opened. That is significantly less than the forty-five minutes required to produce a rubber encapsulated transformer. With the same number of molds, it is thus possible to produce a significantly greater number of encapsulated transformers within a given amount of time. Alternatively, the same number of encapsulated transformers can be produced with significantly fewer molds.

In addition, the transformer coil assembly can be completely encapsulated in a single injection cycle. That is, there is no need to fill any holes in the transformer once the encapsulated transformer is removed from the mold cavity. Likewise, there is no need to perform any finishing operations on the transformer after it is removed from the mold cavity. Further, to the extent the manufacturing process results in waste (e.g., thermoplastic rubber that cools in the runners 126), that waste can be reused. Such is not the case with rubber. Additionally, the manufacturing process is much cleaner than in the case of rubber as it produces significantly less smell and dirt.

The venting arrangement provided by the present invention is also quite useful as it permits transformer coil assemblies of any size to be encapsulated. As compared to smaller transformer coil assemblies, larger transformer coil assemblies require a greater amount of thermoplastic rubber in order to completely encapsulate the transformer coil assembly. That greater amount of thermoplastic rubber must be injected into the mold cavity within a relatively short time frame, which typically results in increased pressures within the mold cavity. The pressure in the mold cavity can range between 17,000 psi–27,000 psi, depending on the size of the transformer. Without the venting arrangements provided by the present invention, it would be quite difficult, if not impossible, to produce larger encapsulated transformers that are free of defects such as massive bulges and voids in the transformer resulting from trapped gasses.

A transformer in accordance with the preferred embodiment of the present invention is completely watertight so as to be impervious to liquids and gasses that could be detrimental to performance of the transformer. The transformer is also capable of continuous outdoor use over a wide range of varying temperatures and is readily capable of properly operating when submerged in the ground with up to 5000 volts on the primary windings. The encapsulated transformer is also characterized by the absence of air pockets that could impair the transformer and the ability to withstand exposure to such elements as sun, oil, gasoline, moisture, acid and alkaline soils. Further, to the extent the encapsulated transformer is used in air field runway lighting systems, the transformer meets relevant FAA specifications.

Reference is now made to FIGS. 11–16 which illustrate the mold cover that is employed in connection with the present invention. Oftentimes, transformers of the same general physical dimensions will have different performance characteristics. For example, transformers having different performance characteristics can be manufactured using cores of the same size, but different numbers of primary and secondary windings. Thus, although both transformers can be encapsulated through use of the same mold, each encapsulated transformer must be separately identifiable. For that reason, it is common practice to provide the mold with some form of identification plate that impresses identification information on one side of the encapsulated transformer. The mold cover of the present invention is designed to allow different identification plates to be readily interchanged with the same mold. In that way, it is not necessary to dedicate a single mold to the production of one transformer.

Figure 11:
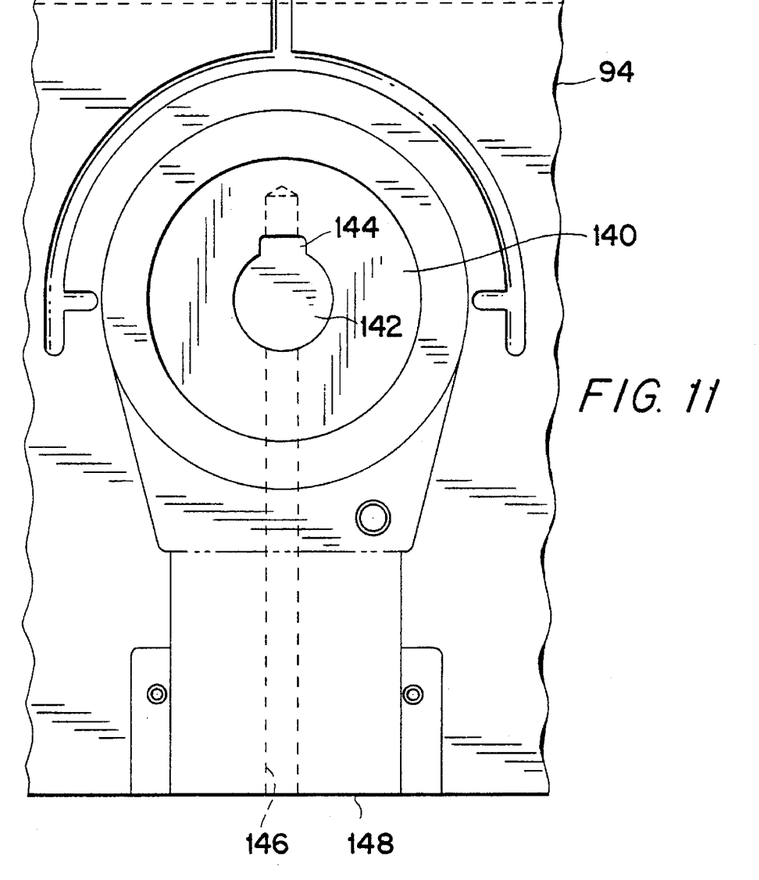
FIG. 11 is a sectional bottom view of the mold cover.
Figure 12:
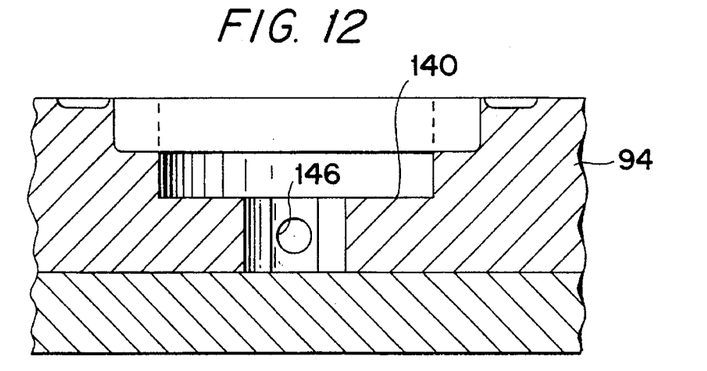
FIG. 12 is a sectional front view of the mold cover.
Figure 14:
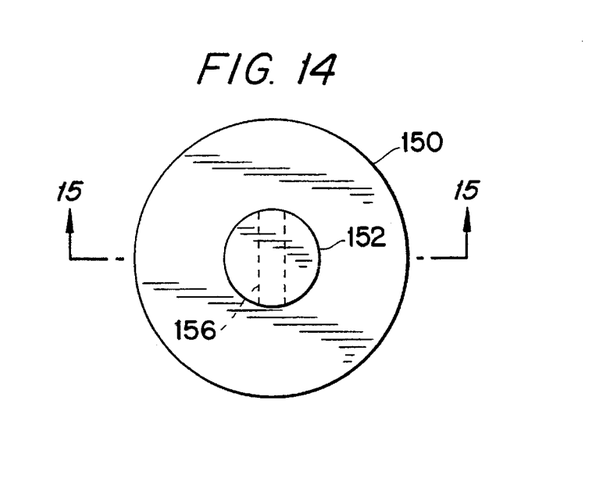
FIG. 14 is a rear view of an identification insert that is to be placed in the mold cover.
Figure 15:
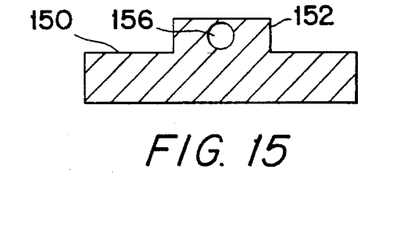
FIG. 15 is a cross-sectional view of the identification insert taken along the section line 15—15 in FIG. 14.

With reference initially to FIGS. 11 and 12, the mold cover 94 is provided with a recess 140 for receiving an identification plate 150 (see FIGS. 14 and 15). The mold cover 94 also includes a boss receiving hollow 142 for receiving the boss portion 152 of the identification plate 150. The mold cover 94 is further provided with a hole 146 that opens to the front face 148 of the mold cover 94. The hole 146 communicates with the boss receiving hollow 142 and extends slightly beyond the boss receiving hollow 142.

The identification plate 150 shown in FIGS. 14 and 15 is adapted to be placed within the recess 140 in the mold cover 94 such that the boss portion 152 is disposed within the boss receiving hollow 142 in the mold cover 94. The identification plate 150 is also positioned within the recess 140 so that a through hole 156 in the boss portion 152 of the plate 150 is aligned with the hole 146 in the mold cover 94.

Figure 13:
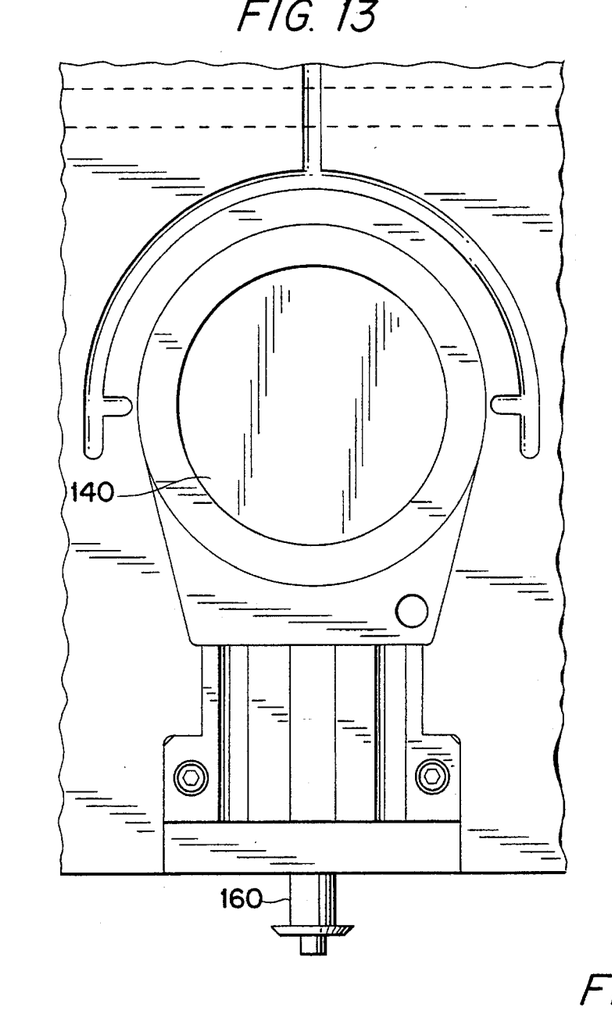
FIG. 13 is a bottom view of the mold cover.
Figure 16:
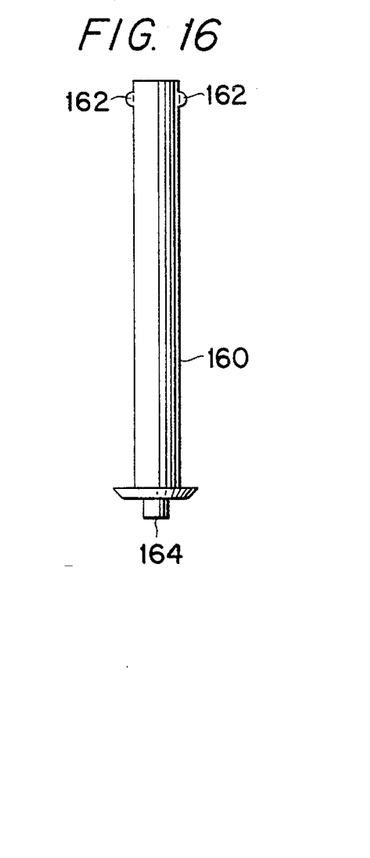
FIG. 16 is a plan view of the ball lock pin used to secure the identification insert in the mold cover.

As seen in FIG. 13, a ball lock pin 160 is received in the hole 146 in the mold cover 94. As generally depicted in FIG. 16, the ball lock pin 160 includes two spring loaded balls 162 that are operatively associated with a movable button 64. By pressing the movable button 164 inwardly (i.e., towards the tip end 163 of the ball lock pin 160), a spring mechanism in the ball lock pin 160 causes the balls 160 to move inwardly to thereby permit withdrawal of the ball lock pin 160 from the mold cover 94.

When the identification plate 150 is properly oriented within the recess 140 in the mold cover 94 so that the through hole 156 in the boss portion 152 of the identification plate 150 is aligned with the hole 146 extending through the mold cover 94, the ball lock pin 160 can be inserted through the aligned holes 146, 156. Once the spring loaded balls 162 on the ball lock pin 160 pass into a region 144 just beyond the boss receiving hollow 142, the balls 162 are forced outwardly to retain the ball lock pin 160 in place. In that way, the identification plate 150 is held in the mold cover 94. To remove the identification plate 150 for purposes of replacing it with a different identification plate 150, the button 164 is pushed towards the tip end 163 of the ball lock pin 160, thereby causing the balls 162 to move inwardly so that the ball lock pin can be pulled put of the mold cover 94.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations, changes and equivalents may be made by others without departing from the spirit of the present invention. Accordingly, it is expressly intended that all such variations, changes and equivalents which fall within the spirit and scope of the present invention as defined in the claims, be embraced thereby.

What is claimed is:

1. An encapsulated transformer, comprising:
   a transformer coil assembly that includes a core having a hollow interior, primary wire windings and secondary wire windings;
   at least one primary lead connected to the primary windings;
   at least one secondary lead connected to the secondary windings;
   a rigid core insert having an upstanding portion positioned within the hollow interior of the core and a base portion on which the transformer coil assembly rests, said core insert having a hole which extends through the base portion and into the upstanding portion wherein the base portion of said core insert has an end face which faces away from said upstanding portion, said end face having at least one groove formed therein that extends from the hole in the core insert to an outer edge of the end face to communicate the hole in the core insert with the outer edge of the end face;
   a unitary thermoplastic rubber jacket surrounding the transformer coil assembly and bonded to the base portion of the core insert to provide a completely waterproof encapsulated transformer.

2. The encapsulated transformer according to claim 1, wherein said upstanding portion of the core insert has an outer peripheral surface that is provided with a plurality of spaced apart grooves extend longitudinally along the upstanding portion, said thermoplastic rubber being disposed in the grooves.

3. The encapsulated transformer according to claim 1, wherein said base portion of said core insert has an outer periphery defined by a plurality of angularly oriented outer peripheral surface portions.

4. The encapsulated transformer according to claim 1, wherein said rigid core insert is fabricated of fiber-filled plastic material.

5. The encapsulated transformer according to claim 4, wherein said plastic material is polypropylene and said thermoplastic rubber jacket is made of a polypropylene based material.

6. The encapsulated transformer according to claim 1, wherein the base portion of said core insert has an end face which faces away from said upstanding portion, said end face having a first surface area defined by a diameter of the end face, said transformer coil assembly having a second surface area defined by a diameter of one end face of the core, the ratio of said second surface area to said first surface area being equal to or less than about 5:1.

7. The encapsulated transformer according to claim 1, wherein said at least one primary lead and said at least one secondary lead extend outside the jacket and are each provided with a casing of thermoplastic rubber, said casing of thermoplastic rubber on the at least one primary lead and the casing of thermoplastic rubber on the at least one secondary lead being bonded to the thermoplastic rubber jacket.

8. The encapsulated transformer according to claim 7, wherein the jacket is made of the same thermoplastic rubber as the casing on the at least one primary lead and the casing on the at least one secondary lead.

9. The encapsulated transformer according to claim 1, wherein said at least one groove in said end face comprises two grooves formed therein that each extend from the hole in the core insert to an outer edge of the end face to communicate the hole in the core insert with the outer edge of the end face.

10. The encapsulated transformer according to claim 9, wherein said two grooves are positioned on diametrically opposite sides of the hole in the core insert.

* * * * *